United States Patent [19]

Yoshizawa et al.

[11] Patent Number: 5,408,562
[45] Date of Patent: Apr. 18, 1995

[54] SUBMARINE, OPTICAL-FIBER CABLE WITH OPTICAL FIBERS HAVING TENSILE STRAIN

[75] Inventors: Nobuyuki Yoshizawa; Tadatoshi Tanifuji; Yasuo Ishino; Takeshi Imai, all of Mito; Akira Mochizuki, Tokyo; Kazumasa Nemoto, Yokosuka, all of Japan

[73] Assignees: Nippon Telegraph and Telephone Corporation; Ocean Cable Co., Ltd., both of Tokyo, Japan

[21] Appl. No.: 188,338

[22] Filed: Jan. 26, 1994

[30] Foreign Application Priority Data

Jan. 27, 1993 [JP] Japan ................................ 5-011755
Jan. 29, 1993 [JP] Japan ................................ 5-298004

[51] Int. Cl.⁶ .............................................. G02B 6/44
[52] U.S. Cl. .................................. 385/112; 385/113; 385/110
[58] Field of Search ............................ 385/100-114

[56] References Cited

U.S. PATENT DOCUMENTS

| | | | |
|---|---|---|---|
| 4,389,088 | 6/1983 | Trezequet | 385/107 |
| 4,401,366 | 8/1983 | Hope | 350/96.23 |
| 4,671,611 | 6/1987 | Allemand et al. | 385/107 |
| 5,013,126 | 5/1991 | Hattori et al. | 385/103 |
| 5,179,611 | 1/1993 | Umeda et al. | 385/113 |
| 5,222,177 | 6/1993 | Chu et al. | 385/105 |

FOREIGN PATENT DOCUMENTS

| | | |
|---|---|---|
| 0500296A1 | 8/1992 | European Pat. Off. |
| 4-212114 | 8/1992 | Japan. |
| 4-81162 | 12/1992 | Japan. |
| 6-102443 | 4/1994 | Japan. |
| 2052982 | 1/1981 | United Kingdom. |

OTHER PUBLICATIONS

Nobuyuki Yoshizawa & Tadatoshi Tanifuji, "Development of a 100-fiber submarine cable", Int'l Wire & Cable Symp. Proc. 1993.

Nobuyuki Yoshizawa & Tadatoshi Tanifuji, "Advanced submarine optical fiber Cable Technologies at NTT", S9 Cables, pp. 290-295; Mar. 1993.

Primary Examiner—Rodney B. Bovernick
Assistant Examiner—John Ngo
Attorney, Agent, or Firm—Adduci, Mastriani, Schaumberg & Schill

[57] ABSTRACT

A submarine, optical-fiber cable having a central metal wire, a slotted rod surrounding the wires, an absorbent sheath surrounding the slotted rod, a plurality of strength members helically wound around the absorbent sheath, a metal jacket surrounding the strength members, and a plastic sheath surrounding the metal jacket. The slotted rod includes peripheral helical slots, and each of the slots may receive at least one optical fiber or at least one optical ribbon. The optical ribbon includes at least two optical fibers. Each of the optical fibers has a tensile strain ranging from about 0.015 to 0.3% along its axis. The absorbent sheath includes a layer surrounding and contacting the slotted rod for absorbing water. The cable is suitable for operating in deep sea beds for a long period of time, for laying and recovering cables, and for quick repair. Modulated strain distribution in the optical fibers suppresses stimulated Brillouin scattering therein.

11 Claims, 11 Drawing Sheets

SUBMARINE, OPTICAL-FIBER CABLE WITH OPTICAL FIBERS HAVING TENSILE STRAIN

BACKGROUND OF THE INVENTION

The present invention relates to a submarine, optical-fiber cable.

FIG. 8 is a transverse cross section of a conventional, submarine, optical-fiber cable having 48 optical fibers. This cable has been actually used in submarine, optical communication in Japan.

Referring to FIG. 8, an assembly unit 82 has a center wire 80 in its center, optical fiber units 81 surrounding the center wire 80, and a resin compound filling any otherwise empty space among them in the assembly unit 82. The optical fiber units 81 include a plurality of optical fibers. Strength members 84a and 84b for resisting tension are disposed around the assembly unit 82. A pressure-resisting tube 85, which may be a copper outer pipe, surrounds the strength members 84a and 84b. A compound 83 for preventing the ingress of water fills the spaces which are within the pressure-resisting tube 85 and outside of the assembly unit 82, and which include spaces between the strength members 84a and 84b. A polyethylene sheath 86 covers the outer surface of the pressure-resisting tube 85, and another polyethylene sheath 87 covers the polyethylene sheath 86.

The submarine, optical-fiber cable is subjected to considerable hydrostatic pressures. In order to protect the optical fibers from compressive stresses in the radial direction, the optical-fiber cable needs a structure to resist the stresses. A pressure-resisting tube 85 made of copper or aluminum is used in the cable of FIG. 8 for this purpose.

The humidity around optical fibers in the cable may increase underwater because water permeates the polyethylene sheaths 86 and 87. Optical fibers are more prone to break under a wet environment than under a dry environment because a minute crack on the surface of optical fibers is more susceptible to grow. To prevent the potential breakage of the optical fibers, a pressure-resisting tube 85 has a hermetic structure without pin holes produced by a welding process.

However, in the process for manufacturing the cable, water may have been adsorbed on surfaces of strength members 84a and 84b and the inner surface of the outer pipe 85. During a step of coating the polyethylene sheath 86, heat is applied and some of the adsorbed water is released into a vapor phase due to the heat. Thus the vaporized water may reach a saturated vapor pressure to form a small amount of dew inside the pressure-resisting tube 85.

Ingress of sea water into the cable due to breakage of pressure-resisting tube 85 may cause corrosion to strength members 84a and 84b to result in the generation of hydrogen, and hydrogen increases optical loss of fibers. Thus it is important to prevent the ingress of water in the cable. Ingress of sea water into the cable may be caused by wear of the cable. Alternatively, such ingress may occur when the cable is damaged or cut off by an anchor thrown from a ship.

Therefore, to prevent water from contacting fiber unit 81 in the conventional cable, a resin that hardens upon the irradiation of ultraviolet rays fills up the otherwise empty spaces around the center wire 80 in the assembly unit 82 in FIG. 8.

Moreover, to prevent water from spreading to the spaces inside the pressure-resisting tube 85 and outside the assembly unit 82, a compound 83 for preventing the ingress of water, such as a polyurethane resin, is provided in the spaces, leaving some intervals between dams made of the compound. To pack a compound 83 for preventing the ingress of water to form a dam requires skills of the highest degree in the process for making the cable. To limit the spread of water entered into the cable within 1 kilometer in a month, all the sum of the cross section of the water passes in the cable should be smaller than the cross section of one water pass having a diameter of 10 μm.

The assembly unit 82 has a function to prevent optical fibers from slipping during laying and recovering a cable. When the cable is laid to or raised from underwater at the depth of a few thousand meters below the sea level, the cable is subjected to a considerable fluctuating tension, which is proportional to the weight of the cable. The tension may reach to 10,000 kgf. Thus the optical fibers in the cable are subject to an elongation strain larger than 0.5%. The assembly unit 82 makes the behavior of optical fibers agreeable to that of the cable.

To sum up, the conventional submarine, optical-fiber cable is characterized in:

(1) that the cable includes a pressure-resisting tube, which has a hermetic structure;
(2) that the cable includes a assembly unit; and
(3) that the cable includes dams made of a compound for preventing water in the spaces inside the pressure-resisting tube 85 and outside the assembly unit 82.

The optical fiber unit 81 usually has six to twelve optical fibers, and the maximum number of the optical fibers in the cable is limited to forty eight.

A buckling pressure, P, of a pressure-resisting tube having an average radius of r is given by the following equation (1):

$$P = \{E/4(1-\nu^2)\}(t/r)^3 \tag{1}$$

wherein the thickness, the Young's modulus, and the Poisson's ratio of the tube are t, E, and $\nu$, respectively.

One embodiment of the cable in FIG. 8 has a pressure-resisting tube or an outer pipe 85 made of copper, having an outer diameter of about 11.4 mm. Thus, the buckling pressure of the tube alone is calculated according to the equation (1) to be about 200 atms. Since the buckling pressure is proportional to the inverse of the cube of the average radius according to the equation (1), the increase in the number of optical fibers leads to a larger diameter of the assembly unit 82, which further increases the radius of the pressure-resisting tube so that the buckling pressure of the tube decreases. Therefore, the number of optical fibers accommodated in the conventional cable is inherently limited.

Bending a cable causes a bending strain ε in the optical fibers in the cable. The bending strain ε in an optical fiber is given by the following equation (2):

$$\epsilon = r_1/r_2 \tag{2}$$

wherein
 $r_1$ is the distance between the center axis of the cable and the center axis of the optical fiber; and
 $r_2$ is the radius of curvature of the cable.

The cable of FIG. 8 having 48 optical fibers has $r_1$ of 2.5 mm. During laying of the cable, the cable is subject to a deflection with the radius of curvature of about 0.5 meters at the sheave in the ship. Thus according to equation (2), the bending strain of the optical fiber on this occasion reaches to 0.5%.

The further increase in the number of optical fibers in the cable leads to the increase in the bending strain of the optical fibers, raising the probability that optical fibers will be cut off. Moreover, it is technically difficult to guarantee reliability of the cable having the structure with increased number of optical fibers over a long period of time. Therefore, it is difficult to increase the number of the optical fibers in the cable of FIG. 8 to more than forty eight.

The increase in the number of optical fibers in the cable of FIG. 8 prolongs the time required to splice optical fibers. To connect between optical fibers, fine, fragile optical fibers in a fiber unit have to be separated from the fiber unit. It takes time to complete this separation, and the time required for the separation increases as the number of optical fibers increases. Moreover, each of the optical fibers in the cable of FIG. 8 is discrete so that each fiber has to be separated from the unit and then spliced to another fiber one by one. As a result it takes about eight hours to splice optical fibers in the cable of FIG. 8. Furthermore, it is not easy to recognize each fiber because the fiber is so thin. The repair of the cable has to be done within 24 hours at sea partly because the weather may not be stable. Therefore, it is difficult to increase the number of the optical fibers in the cable of FIG. 8 to more than forty eight from this point of view also.

For all the reasons mentioned above the maximum number of optical fibers in the cable of FIG. 8 is limited to forty eight.

On the other hand, FIG. 9 is an example of a transverse cross section of a conventional, land, optical-fiber cable having 100 optical fibers. This cable has a slotted rod 93 surrounding a center wire 94. Each of the slots on the rod 93 has five optical ribbons 91 stacked together, and each of the ribbons 91 contains four optical fibers. A tape 92 for absorbing water is disposed around the slotted rod 93, and a polyethylene sheath 95 surrounds the absorbent tape 92. A pair of fibers 96 are disposed in one of the slots. The cable shown in FIG. 9 does not contain a hermetic metal tube for resisting pressure so that the cable is not suitable for its application in a submarine environment.

SUMMARY OF THE INVENTION

The object of the present invention is to provide a submarine, optical-fiber cable suitable for operating in deep sea beds for a long period of time, for laying and recovering the cable, and for a quick repair. Specifically the object of the present invention is to provide a submarine, optical-fiber cable, which has a hermetic pressure-resisting structure that withstands compressive stresses at deep sea; which prevents water entered into the cable from spreading in the cable; which reduces slippage of optical fibers during laying and recovering the cable; which allows for splicing of optical fibers within 24 hours on a cable ship; and which excels in reliability over a long period of time. Another object of the present invention is to provide a cable which contains optical fibers having tensile strains modulated along an axial direction thereof so as to suppress stimulated Brillouin scattering in the optical fibers so that permissible input power to the optical fibers increases.

One embodiment of the present invention provides a submarine, optical-fiber cable comprising a center wire; a slotted rod surrounding the center wire, the slotted rod including peripheral helical slots, at least one of the slots receiving an optical ribbon, the optical ribbon having at least two optical fibers, each of the at least two optical fibers having a tensile strain ranging from about 0.01% to 0.3% along its axis; an absorbent sheath surrounding the slotted rod and closing the slots of the slotted rod, the absorbent sheath including a layer surrounding and contacting the slotted rod for absorbing water; a plurality of strength members helically wound around the absorbent sheath; a metal jacket surrounding the strength members, the innermost surface of the metal jacket contacting at least one of the strength members; at least one dam for preventing ingress water from spreading through a space between the strength members and between the absorbent sheath and the metal jacket; and a plastic sheath surrounding the metal jacket, the innermost surface of the plastic sheath contacting the metal jacket; wherein the cable is able to withstand hydrostatic pressures to which it is subjected.

Alternatively, one of the slots may receive at least one optical fiber.

As mentioned above, it is difficult to increase the number of optical fibers to more than 48 optical fibers with the cable structure having the assembly unit. Thus the cable of the present invention has adopted a so-called slot structure in which optical fibers are installed in the slots in a slotted rod. To satisfy all the objects of the present invention, the cable of the present invention has a hermetic pressure-resisting structure; an absorbent sheath contacting the radial surface of the slotted rod; and, to match the cable strain along its axis with the strain of the optical fibers, optical fibers having a tensile strain ranging from about 0.01% to 0.3% along its axis are disposed in the slots in the slotted rod.

The prevention of the ingress of water in the cable under hydrostatic pressures more than a few hundred atms and the formation of dew inside the pressure-resisting tube, depends on the capability of the absorbent sheath.

A winding pitch of the steel wires may be modulated along an axial direction thereof so as to modulate residual tensile strain in the optical fibers. The strain distribution in the optical fibers suppresses stimulated Brillouin scattering therein.

The winding pitch of the strength members may smoothly change within a range of about 10 to 100 times as much as the outer diameter of the slotted rod so as to modulate the tensile strain of the optical fibers so that stimulated Brillouin scattering in the optical fibers is suppressed. The range of the winding pitch could correspond to 100 mm to 1000 mm. Preferably, the winding pitch of the strength members smoothly changes within a range of 200 mm to 500 mm.

BRIEF DESCRIPTION OF THE DRAWING

Further details are explained below with the help of the examples illustrated in the attached drawings in which.

DETAILED DESCRIPTION OF THE PREFERRED EMBODIMENT

Figure 1:
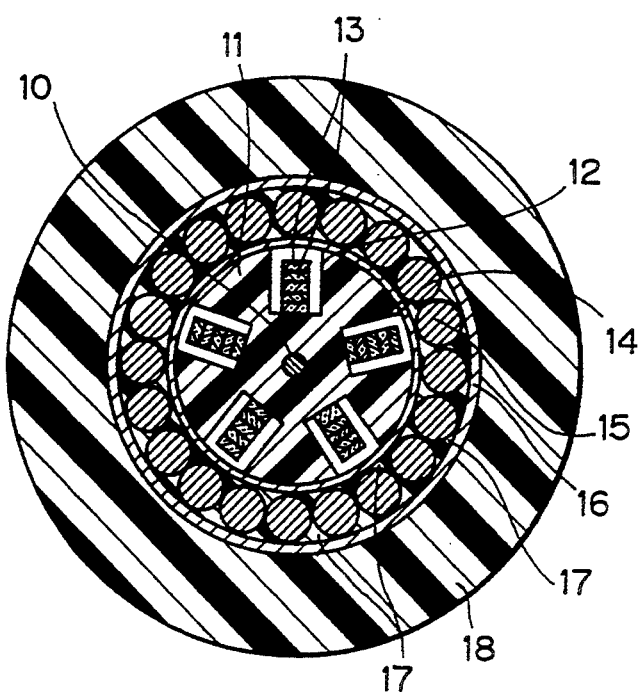
FIG. 1 is a transverse cross section of a submarine, optical-fiber cable having 100 optical fibers according to the present invention.

FIG. 1 is a transverse cross section of an embodiment of a submarine, optical-fiber cable having 100 optical fibers according to the present invention. Table 1 shows sizes and materials for components of the embodiment.

A center wire 10 is disposed at the radially innermost position of the cable. The axis of the wire coincides with the cable axis. The center wire is not meant to withstand the tensile stresses applied to the cable. The presence of the center wire 10 facilitates to produce a slotted rod 11 by extrusion. Needless to say, instead of the center wire, a strand of helically wound steel wires may be used so as to contribute to the cable withstanding the tensile stresses.

A slotted rod 11 surrounds the wire 10 without leaving empty clearance spaces between the rod 11 and the wire 10. The rod 11 is made of, for example, a plastic material, such as polyolefins and nylons.

The rod 11 has helical slots 12 which continuously extend over the whole length of the cable. Each slot 12 may receive at least one optical ribbon 13. However, where the number of optical fibers needed is limited, some of the slots 12 may not include any optical ribbon 13.

Each slot 12 extends as a continuous helix having a pitch which may be about 25 to 60 times as much as the outer diameter of the rod 11. For example, when the outer diameter of the rod is 9.5 mm, the pitch of the helix may range from about 250 to 600 mm.

Slotted rod 11 provides sufficient compression strength so as to retain the solid part between two adjacent slots 12. According to the embodiment shown in FIG. 1, a material for the slotted rod 11 preferably has a Young's modulus not less than about 160 kgf/mm$^2$ in which 1 kgf is equivalent of 9.80665N. For example, a slotted rod 11 may have an outer diameter of 9.5 mm and may be made of a high density polyethylene having a Young's modulus of about 160 kgf/mm$^2$. The rod 11 is produced in a conventional manner, for example, by extrusion around the center wire 10.

Each slot 12 may receive at least one optical ribbon 13, as the embodiment shown in FIG. 1. An optical ribbon 13 contains at least two, for example, several, optical fibers in a ribbon arrangement through, for example, an appropriate adhesive, a synthetic polymer, etc. A slot 12 having a width of 1.4 mm and a depth of 2.8 mm, for example, may contain five or six ribbons 13 horizontally stacked, and each of the ribbons 13 may contain four optical fibers.

Each slot 12 may have an empty space where optical ribbons 13 are not disposed as shown in the embodiment shown in FIG. 1.

Figure 5:
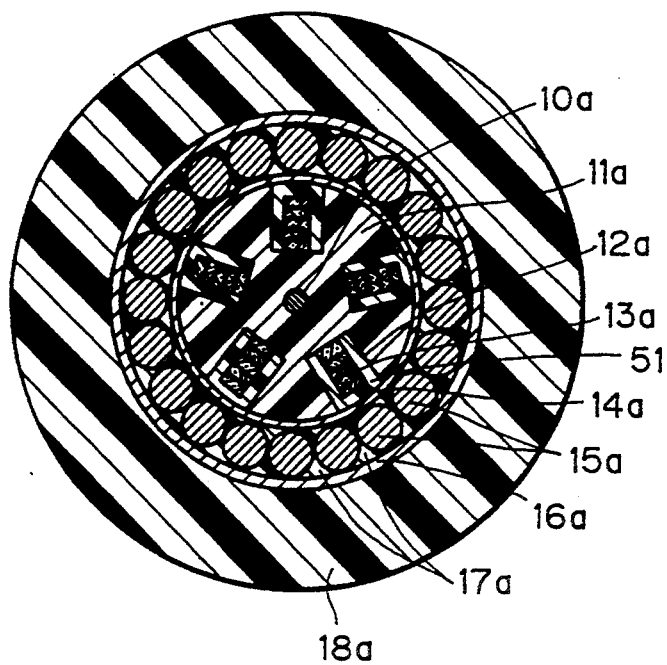
FIG. 5 is a transverse cross section of a submarine, optical-fiber cable according to the present invention, which has a soft resin filled in the space in each slot.

Alternatively as shown in FIG. 5, a soft synthetic jelly 51 may be filled in the space in each slot 12a so as to prevent water ingress in the slot 12a. Preferably the synthetic jelly has a Young's modulus about 1 kgf/mm$^2$.

Optical ribbons 13a in slots 12a can be partly filled by silicon grease, other greases, or a soft polymeric synthetic resin for substantially preventing the transmission of isostatic pressure to the optical ribbons 13a. The compound keeps optical ribbons 13a situated on the bed of the slots 12a.

Figure 6:
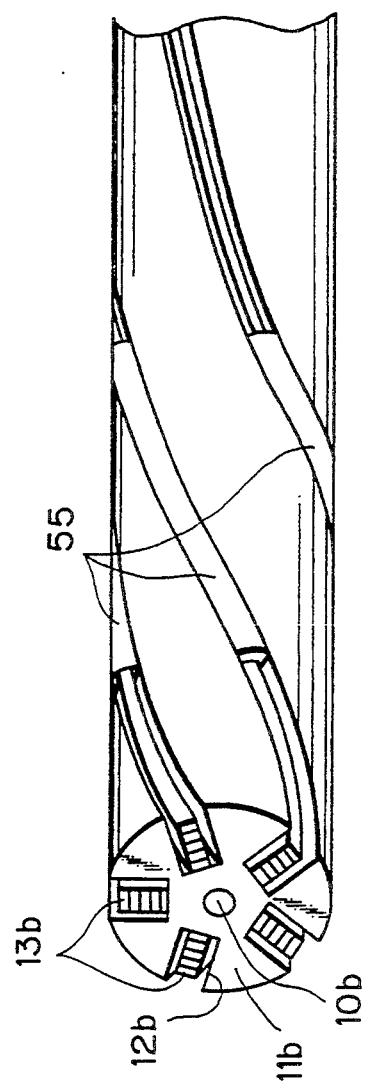
FIG. 6 is a cross section of a submarine, optical-fiber cable in accordance with the present invention, which has a hard resin in slots leaving intervals between them.

In an alternative embodiment as shown in FIG. 6, dams 55 may be disposed in every score of meters in the slot 12b. A dam may be made of a polyurethane resin that has a property such that the resin becomes hard upon curing. Alternatively, the dam may be made of the soft synthetic jelly.

In the embodiment of FIG. 5, the Jelly 51 continuously fills the space in the slot along the slot direction. In contrast, in the embodiment of FIG. 6, the space in the slot is discontinuously filled along the slot direction.

An optical fiber can have a slight tensile strain along its axis ranging from about 0.01% to 0.3%, preferably ranging from about 0.05% to 0.2% so that the optical fiber does not undergo much withdrawal or fiber-slipping during laying and recovering the cable. The optical fiber with the slight tension is made by giving a back tension of, for example, about 0.05 kgf. 1 kgf is equivalent to 9.80665N. An optical fiber without the strain is known in literature, for example, Japanese Patent Publication 58-54362.

Preferably an optical fiber is coated with carbon. The surface roughness of the carbon coat is further preferably smaller than 50 nm, measured by a scanning tunneling microscope, so as to increase the mechanical strength of the optical fiber.

An absorbent sheath is disposed around slotted rod 11, and the sheath may be an absorbent tape 14. The absorbent sheath has an absorbent layer for absorbing water on its inner surface so that the absorbent layer closes the slots 12 of the slotted rod 11. The absorbent layer is in close contact with slotted rod 11. The absorbent layer includes a compound that absorbs water, for example, an acrylic compound including a polyacrylate and a copolymer of acetylvinyl and methyl acrylate. Preferably the acrylic compound is adapted to be used in water containing salt, such as sea water. The absorbent sheath is not intended to resist stresses either in the longitudinal or transverse direction.

According to the embodiment shown in FIG. 1, an absorbent tape 14 is wound around the rod 11, and the tape 14 is provided as a absorbent sheath. The absorbent tape has a absorbent compound coated onto an inner surface of the absorbent tape to form an absorbent layer. In this embodiment, the absorbent tape 14 with the coated surface closes the slot 12 of the slotted rod 11 so that the absorbent compound is in contact with the slots 12.

The absorbent tape 14, for example, is made of a polysulfone resin such as UDEL which is the registered trade name from Union Carbide, ASTREL which is the registered trade name from 3M, and VICTREX which is the registered trade name from ICI. For example, an absorbent tape having a width of 30 mm is wound around the slotted rod 11 with a half lap such that about a half width of the absorbent tape of the second lap overlaps about a half width of the first lap of the tape which is situated under the second lap of the tape.

Preferably the absorbent compound is in a powder form and has a property to expand upon absorbing water. The absorbent powder is preferably coated onto an absorbent tape such that the powder is removable from the absorbent tape. Upon ingress of water into slots 12 in the cable, the powder removed from the absorbent tape 14 absorbs ingress water and expands inside the slot 12 so as to block the water from spreading further inside the slot 12.

In one embodiment of the invention as shown in FIG. 1, a center core has a center wire 10, a slotted rod 11 having peripheral helical slots 12, optical ribbons 13 in each slot 12, and an absorbent tape.

A plurality of strength members 15 are helically wound around the absorbent sheath. Innermost strength members 15 contact with absorbent sheath 14. The strength members 15 have sizes and strength sufficient to withstand tension stresses which are applied to the cable during laying and recovering thereof into and out of water.

A metal jacket or an outer pipe 16 surrounds the strength members 15. The innermost surface of the metal jacket 16 contacts the outermost strength members 15, and preferably the outermost strength members 15, which are helically wound, depress the innermost surface of the metal jacket so as not to unwind the members. The metal jacket 16 provides sufficient compression strength so as to resist considerable hydrostatic pressures at deep sea. Preferably the pressure-resisting tube 16 has a hermetic structure.

The metal jacket 16 may be formed by welding a metallic tape, such as a copper tape, in direct contact with the radially outermost strength members 15. Then this cable with the secured metal jacket may undergo drawing through a die, followed by sinking so that the innermost surface of the metal jacket 16 is depressed by the radially outermost strength members 15 so as to integrate the metal jacket 16 and the strength members 15. For example, the metal jacket 16 which is made of a copper tape with a thickness of 0.7 mm has an outer diameter of 15.0 mm.

Dams 17 are disposed between the strength members 15 so as to prevent ingress water in the cable from spreading inside the metal jacket 16. Dams are made of a compound for preventing ingress water, such as a polyurethane resin. For example, the polyurethane resin disclosed in U.S. Pat. No. 4,726,649 may be used. Dam 17 fills the space between the absorbent sheath 14 and the interior of the metal jacket 16. Dams 17, made of a polyurethane resin, are disposed in the space leaving intervals of about every 10 meters along the axis.

Figure 2:
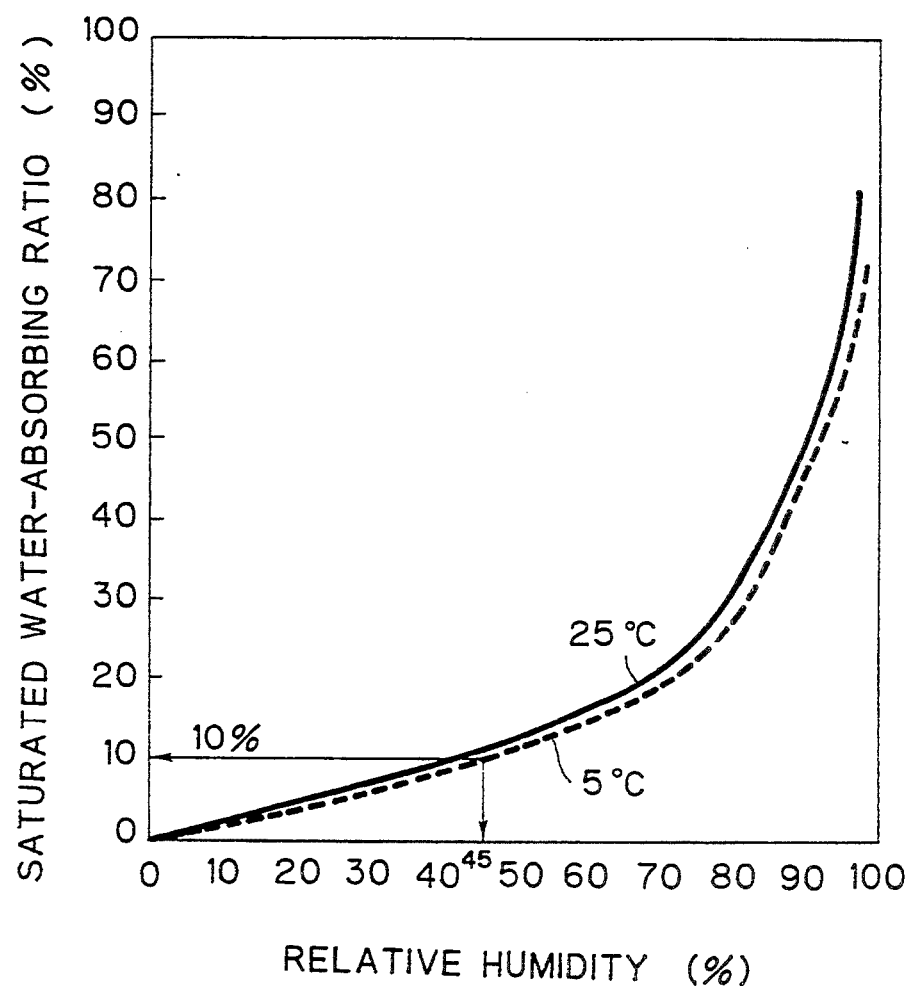
FIG. 2 correlates a saturated water-absorbing ratio of the absorbent tape used in the embodiment of FIG. 1 with a relative humidity at 25° C. as well as at 5° C.

FIG. 2 is a graph correlating a saturated absorbent ratio of the absorbent tape used in the embodiment of FIG. 1 with a relative humidity at 25° C. as well as at 5° C. A saturated absorbent ratio is the ratio of the weight of a dry absorbent tape to the weight of the same absorbent tape that has absorbed water up to its saturation. This saturated absorbent ratio indicates how much water the absorbent tape can absorb.

FIG. 2 shows that the saturated absorbent ratio of the absorbent tape increases as the humidity of the environment in which the tape is situated increases. However, the saturated absorbent ratio does not change much by differing temperatures. Therefore, when an absorbent tape does not reach its water saturation at room temperature, the water vapor inside the metal jacket 16 does not form dew because the metal jacket 16 is hermetic.

The humidity inside the pressure-resisting tube 16 depends on the absorbent ratio of the absorbent tape at the time of forming a metal jacket, for example, welding a metallic tape, because the humidity due to sea water outside the cable does not reach the inside of the hermetic pressure-resisting tube 16. As shown in FIG. 2, when the absorbent ratio of the absorbent tape is 10%, the relative humidity inside the pressure-resisting tube 16 can be maintained at about 45%. The humidity of this level is favorable to maintain the reliability of optical fibers for a long period of time. To keep the absorbent ratio of the absorbent tape below the saturated absorbent ratio at the time of completing the cable the humidity inside the metal jacket 16 is controlled because the tape 14 has capacity to adsorb water inside of the metal jacket 16.

A plastic sheath 18 is coated onto the metal jacket 16, and the plastic sheath may be made of polyethylene.

During the coating step, a part of 20 mg of the water adsorbed onto the surfaces of one meter of a copper pipe becomes water vapor, and the part of water is released into the inside of the metal jacket. Thus, a conventional cable has a possibility that the water may result in dew formation inside the metal jacket.

In contrast, a cable of one embodiment of the present invention has an absorbent tape 14, which has the capacity to absorb water to prevent dew from forming. Therefore, a cable of one embodiment of the present invention has the advantage that dew formation inside the metal jacket 16 does not occur due to the tape 14. Consequently a cable of the present invention is free of adverse effects due to dew inside the metal jacket 16, and the adverse effects include, for example, oxidation of strength members 15, which deteriorate mechanical strength thereof, and hydrogen generation, which increases optical loss.

Figure 9:
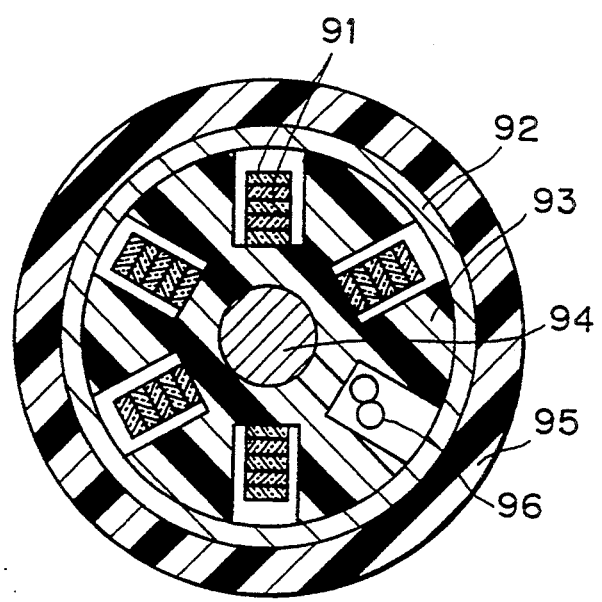
FIG. 9 is a transverse cross section of a conventional, land, optical-fiber cable having 100 optical fibers.

On the other hand, a land, optical-fiber cable as shown in FIG. 9 does not have a hermetic structure, and water vapor permeates through plastic sheath 8, which is water-permeable so that the inside of the cable may fill with water vapor up to a saturated absorbent ratio. Thus it is impossible to use the land cable underwater.

Figure 3:
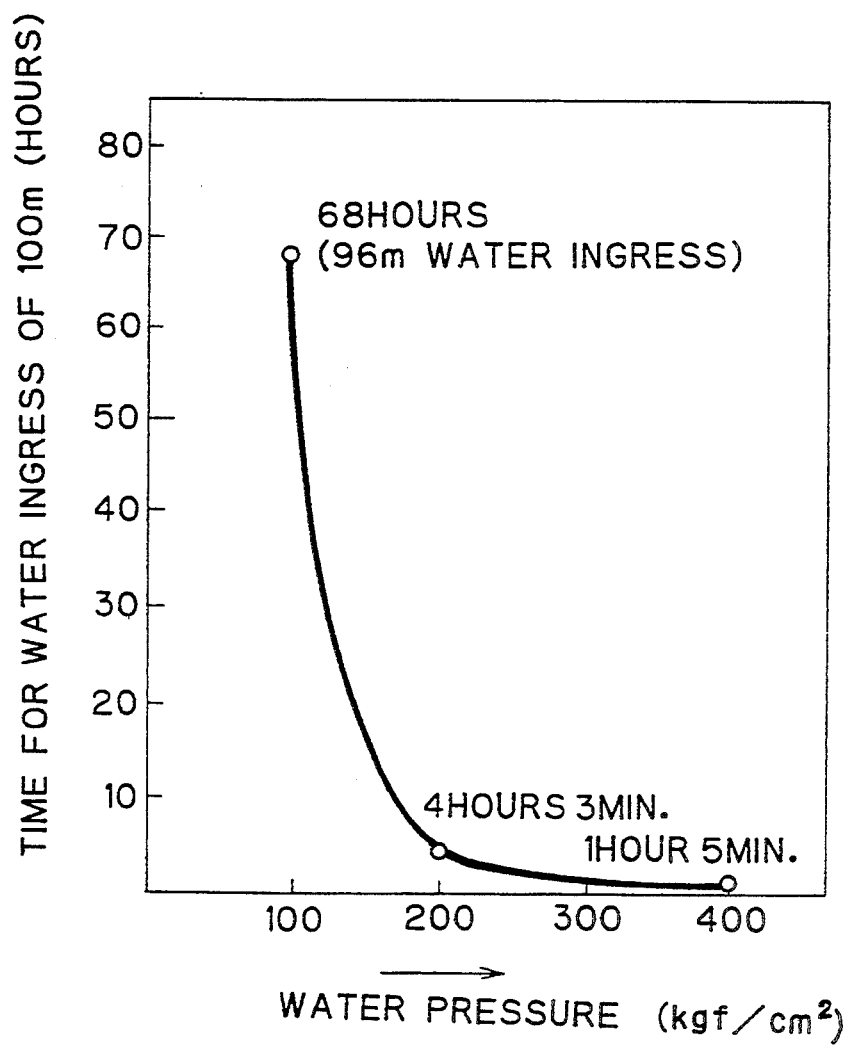
FIG. 3 demonstrates the result of water ingress into the cable of the embodiment shown in FIG. 1 under pressure.

FIG. 3 demonstrates the length of water ingress into the cable of the embodiment shown in FIG. 1 under pressure. A test was performed in which ingress of water into the cable was measured. The cable having a length of 120 meters was inserted into a pressure-resisting pipe for the water ingress test. Then artificial sea water under a certain pressure was applied to one of the open ends of the cable so that water flows into the cable from the one open end to the direction of the other open end. After keeping the water pressure constant for a certain time, the pressure to the water was decreased to normal. Subsequently, the cable was taken out of the water and disassembled, and then the length of ingress of water from the entering open end was measured.

The test shows that it takes 65 minutes to have a one-hundred-meter ingress of water under 400 atmospheric pressures. Since the length of water ingress in a cable is proportional to the square root of time, the ingress of water over a period of two weeks is estimated, based upon the data, to be about 1800 meters. Therefore, this performance of the cable of FIG. 1 is satisfactory for its practical application under considerable water pressure.

One method of raising a submarine, optical-fiber cable from a deep sea involves cutting the cable into pieces at the sea bottom, and raising each piece of the cable so as to decrease the tension required during recovery of the cable. However, when this method is carried out, the optical ribbons or the optical fibers of the piece may withdraw to a certain extent from the cut section during the recovery operation. The shorter this withdrawal length or the fiber slippage of the optical ribbon during the operation, the better.

The withdrawal length of the optical ribbon 13 or the length of the fiber slippage in the cable of FIG. 1 having a length of 120 meters was measured when a cyclic tension of 4500±1000 kgf was applied over a period of 300 minutes. The tension was periodically alternated with a cycle of 6 seconds. Time was taken as a variable, and the longest one was five hours. The experimental conditions are equivalent to conditions under which the cable at the depth of 4000 meters in the sea is raised.

Figure 4:
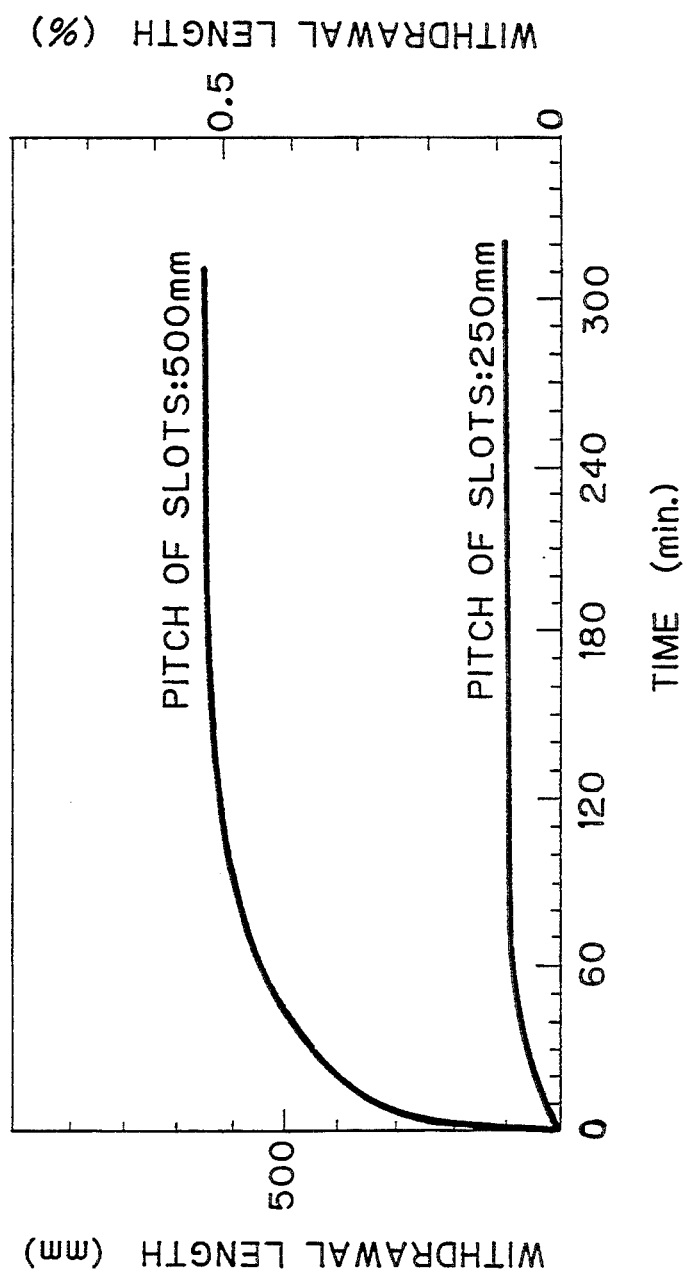
FIG. 4 correlates a withdrawal length of an optical ribbon in the cable of FIG. 1 having a length of 120 meters and time during which the cable is subject to a tension of 4500±1000 kgf.

FIG. 4 shows the result of the test and correlates a withdrawal length or a fiber-slippage length of an optical ribbon 13 and time during which the cable is subject to tension. After two hours under tension, the withdrawal length of the optical ribbon 13 was 60 cm when the pitch of the slot 12 of the cable was 500 mm. In contrast, the withdrawal length of the optical ribbon 13 was 8 cm when the pitch of the slot 12 was 250 mm. Thus we have found that a shorter pitch of the slot 12 reduces the withdrawal length of the optical ribbon 13. The shorter pitch of the slot 12 probably increases the friction force between the optical ribbon 13 and the slot 12.

After water with a pressure of 100 atmospheric pressures was applied for one hour to one open end of the cable of FIG. 1 with a length of 120 meters having the pitch of the slot 12 of 500 mm, the same experiment on this cable was carried out to determine the withdrawal length. It has turned out the withdrawal of the ribbon 13 was not observed after the tension was applied to the cable for five hours. This is caused, we reason, by the increase of the friction force of an optical ribbon 13 with the slot 12 due to the expansion of the absorbent tape 14.

Therefore, a shorter pitch of the slot 12 and an absorbent tape 14 reduce the withdrawal length of an optical ribbon 13 during recovery of a cable which is cut into pieces.

When the pitch of the slot 12 is too long, it becomes difficult to relax the bending strain of optical fibers. Thus the upper limit of the pitch of the slot 12 is about 600 mm.

The result of a water pressure test of the cable of FIG. 1 is disclosed hereinafter. Since the slotted rod 11 made of a high density polyethylene having a Young's modulus of about 160 kgf/mm$^2$ supports the pressure-resisting tube 16 through strength members 15, a buckling pressure of the cable is larger than the value calculated from equation 1 for the tube alone. The pressure test shows that the buckling pressure of the cable is larger than about 800 atmospheric pressures, and this value is satisfactory in laying and operating the cable at great depth.

The cable of the present invention has two advantages over the conventional cable when splicing the optical fibers. Firstly optical fibers in the cable of the present invention are disposed in slots 12 so that it is easier to take out the optical fibers. Secondly several, for example four, optical fibers in the cable of the present invention are bound together in a form of optical ribbon 13 so that splicing optical ribbons 13 using an equipment for splicing multi-fibers by fusion is much easier than splicing individual optical fibers one by one. Moreover, color recognition is easier when optical ribbons 13 are used. As a result it takes only four hours to take out optical fibers and to splice the optical fibers in the cable having as many as 100 optical fibers as shown in FIG. 1.

The optical-fiber cable of the present invention may suppress stimulated Brillouin scattering in the optical fibers. As Japanese Patent Application Laid-Open 4-212114, which corresponds to U.S. Pat. No. 5,136,673, discloses, an optical fiber may be given strain modulated along its axial direction so as to suppress stimulated Brillouin scattering. In a process of manufacturing the cable of the present invention, optical fibers may be given modulated strain along its axis.

The process for manufacturing the cable may include the steps of:

(1) making a core unit further including the steps of installing optical fibers into slots of a rod, and then winding an adsorbent tape around the rod so as to close the slots;

(2) arranging a plurality of steel wires surrounding the core unit, and then forming a metal jacket, which may be a welded copper pipe, surrounding the steel wires; and (3) extruding a polyethylene sheath surrounding the metal jacket.

Figure 10:
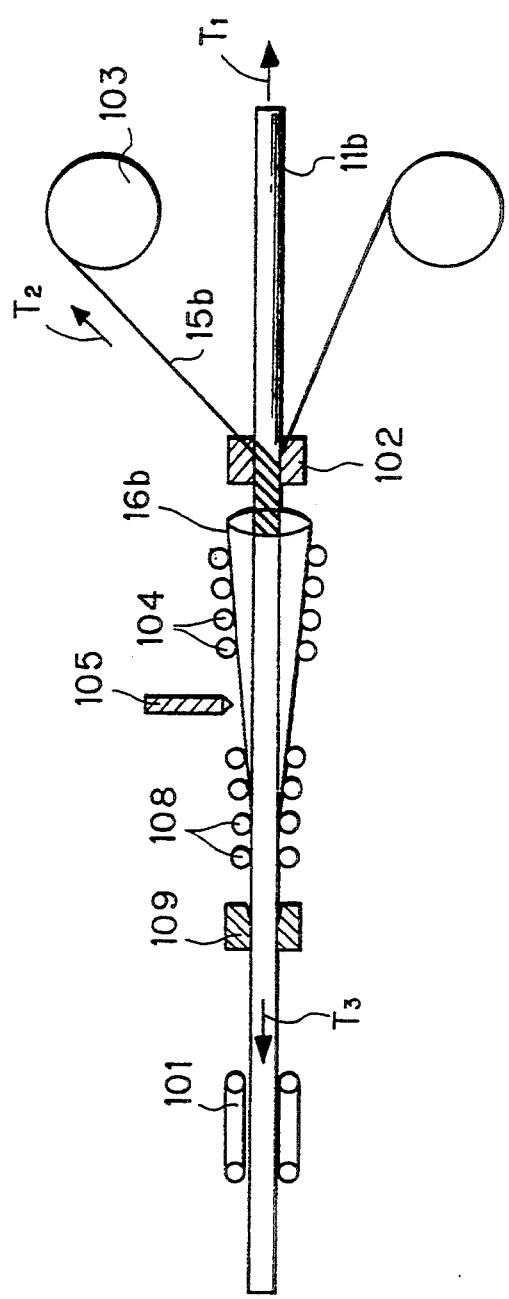
FIG. 10 is a side view with a part of a cross section, showing steps of arranging steel wires and forming a metal jacket.

FIG. 10 shows the second step of arranging steel wires and forming a metal jacket. A slotted rod 11b is drawn by a caterpillar 101 by a drawing tension of T3. The slotted rod 11b passes through a die 102 for winding steel wires 15b around the rod 11b. The rod 11b is subject to a back tension of T1, and the steel wires 15b are subject to a back tension of T2. The rod 11b further passes through a former 104, and an apparatus 105 for welding a copper pipe 16b.

Figure 11:
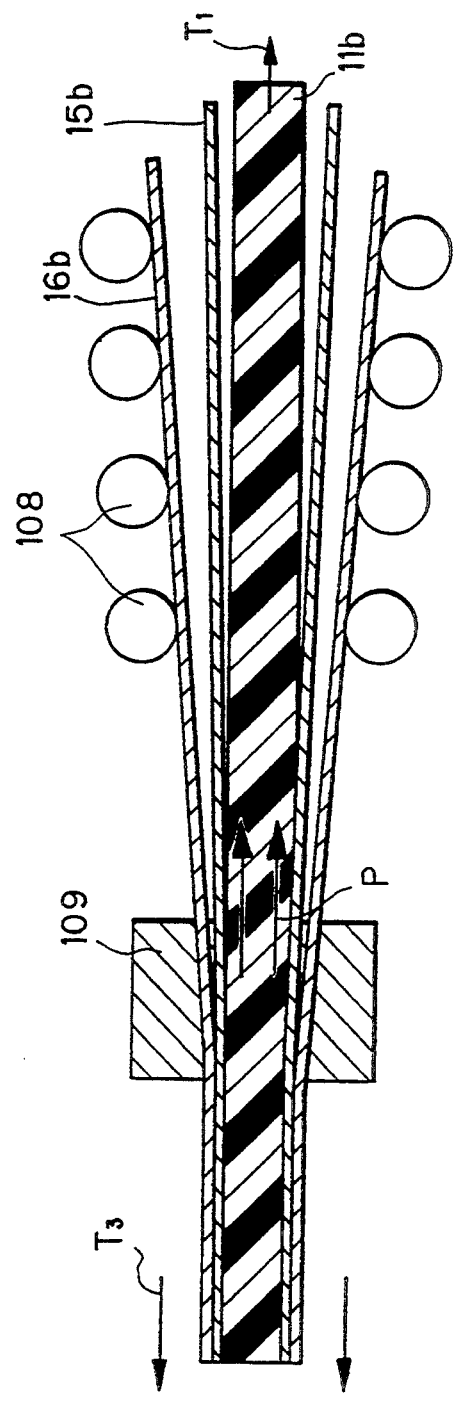
FIG. 11 is a cross section of an expansion of a part of FIG. 10.

FIG. 11 is an expansion of a part of FIG. 10, and FIG. 11 shows a step of reducing the diameter of a welded copper pipe 16b using a reducer 108 for roll forming and a drawing die 109. The drawing die 109 reduces the diameter of the copper pipe 16b so as to contact an inner surface of the copper pipe 16b with steel wires 15b and steel wires 15b with the core unit, giving a compression force around the slotted rod 11b through steel wires 15b. As a result, the slotted rod 11b is subject to a drawing force P in a backward direction so as to give a tensile strain to both the slotted rod 11b and optical fibers in the slot.

After the rod 11b passes through a drawing die 109, the copper pipe 16b and the steel wires 15b integrate with the core unit so that the tensile strains of the rod 11b and optical fibers remain in the resultant cable. The residual tensile strains are proportional to the drawing force P. Since the drawing force P depends upon the friction coefficient between steel wires 15b and the core unit, a longer winding pitch of the steel wires 15b reduces the friction coefficient so as to decrease the drawing force P. Therefore, modulation of the winding pitch of the steel wires leads to modulation of residual tensile strain.

Moreover, the residual tensile strains may be reduced by an increase of the tensile rigidity of the rod. Obviously, the smaller the outer diameter of the rod, the smaller the residual tensile strains. Therefore, the residual tensile strains may be modulated by modulation along its axial direction of the tensile rigidity of the rod or of the outer diameter of the rod.

Figure 12A:
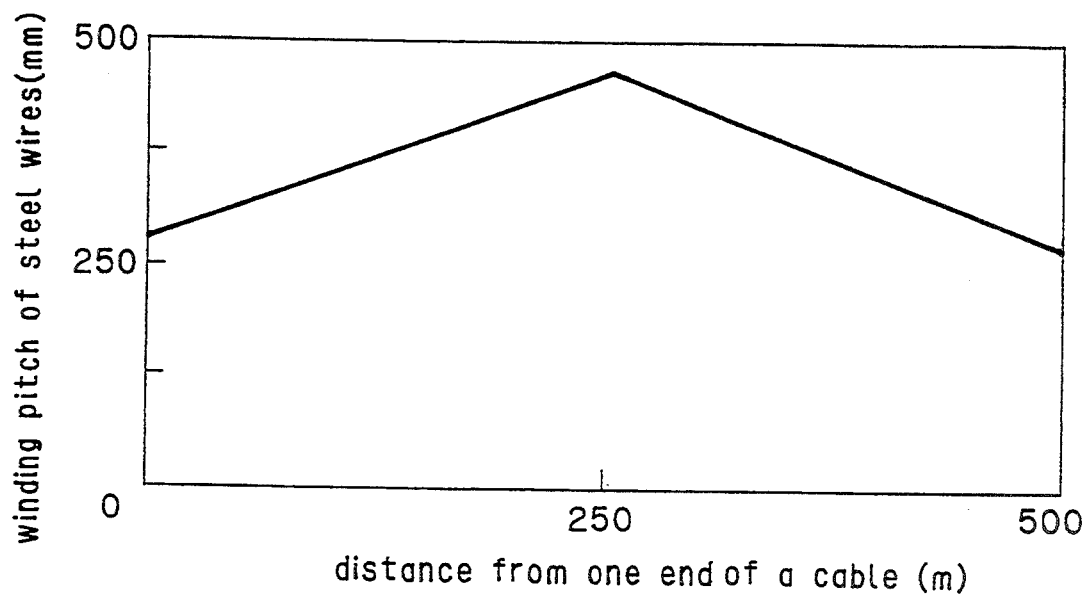
FIG. 12(a) correlates a winding pitch of the steel wires and the distance from one end of a cable.
Figure 12B:
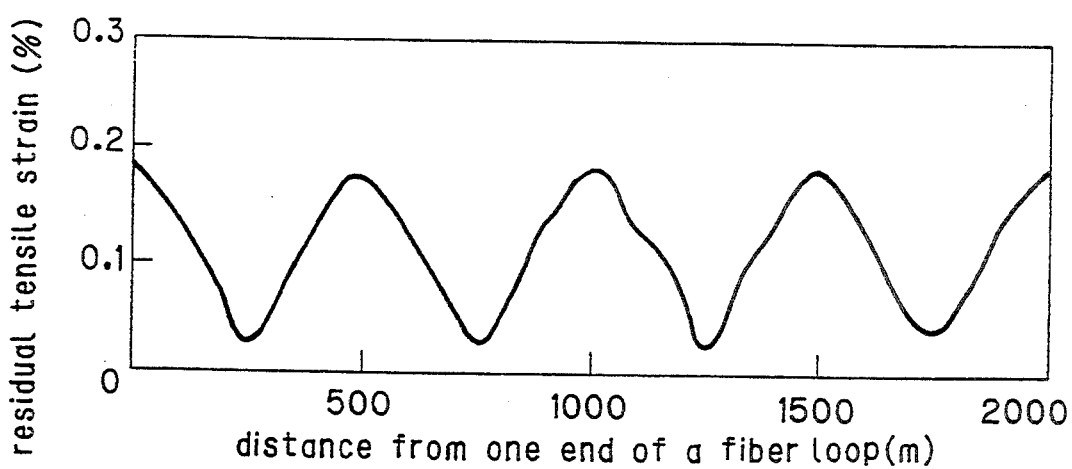
FIG. 12(b) correlates a residual tensile strain in an optical fiber and a distance from one end of a fiber loop.

FIGS. 12(a) and 12(b) show a relation of the winding pitch of the steel wires and a residual tensile strain of an optical fiber. The relation is a result of a measurement. For the measurement, a cable having a length of 500 meters was made while the winding pitch of the steel wires were modulated along the axial direction of the cable.

In FIG. 12(a), the pitch of the steel wires smoothly changes within a range of 200 mm to 500 mm, and the winding pitch changes from 280 mm to 470 mm and then 470 mm to 280 mm. In other words, the bend at the winding pitch of 470 mm is permissible for satisfying the meaning of "smoothly". Though the change of the winding pitch in FIG. 12(a) is linear along the cable, the change of the winding pitch is not limited to be linear. For example, the winding pitch of strength members may change in accordance with a sine curve along a cable.

In the cable, optical ribbons having four optical fibers were installed in the slots, and the ends of the four optical fibers in one of the optical ribbons were connected by fusion splicing so as to give a loop of optical fibers having a length of 2000 meters. The distribution of tensile strain along the axial direction of the loop was measured by a Brillouin OTDA. The other specification of the cable is disclosed in Table 1. Optical fibers were coated with carbon which excel in reliability over a long period of time for tensile strain.

As shown in FIG. 12(b), tensile strain of the loop ranges from 0.05 to 0.2%, in response to the modulation of the winding pitch so that permissible input power to the optical fibers increased by more than 20 dB. The tensile strain did not increase transmission loss of the optical fibers.

On the other hand, a maximum tensile strain in optical fibers of 0.35% led to a transmission loss of 0.02 dB/km when a light having a wavelength of 1.5 $\mu$m is transmitted through the optical fibers. The optical fibers were a single mode having a wavelength of 1.5 $\mu$m with zero dispersion. A tensile strain of no more than 0.3% is preferable so as to keep the transmission loss small.

In FIG. 12(b), the tensile strain in the loop changes periodically along its axial direction. However, to suppress stimulated Brillouin scattering, the modulation of the tensile strain in an optical fiber is not limited to be periodic along the axial direction thereof.

Figure 8:
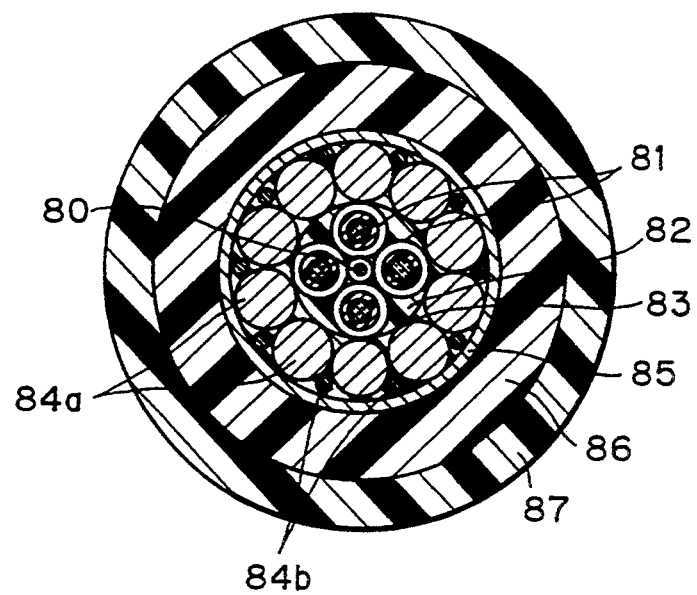
FIG. 8 is a transverse cross section of a conventional submarine, optical-fiber cable.

To make the cable of the present invention is easier than to make the conventional cable shown in FIG. 8. To form a central core having 48 optical fibers in the cable of FIG. 8, optical fiber units having 12 optical fibers are made as the first step, and then four units are assembled together in the second step. In contrast, to make the cable of the present invention only one step requires that optical ribbons 13 are inserted into slots 12. Thus it takes less time to make the cable of the present invention than the conventional cable, and it costs less by 30% to make the cable of the present invention than the conventional cable.

Figure 7:
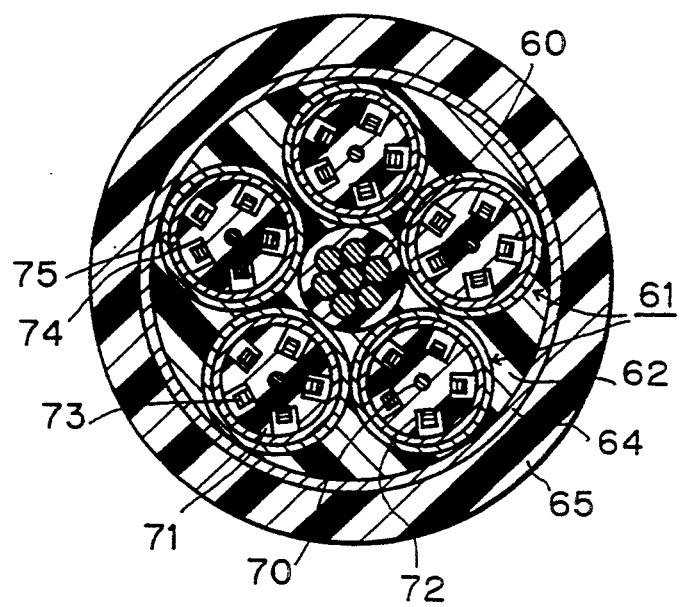
FIG. 7 is a cross section of a submarine, optical-fiber cable in accordance with the present invention, which has several core units.

In an embodiment of the invention as shown in FIG. 7, a cable has a strand 60 of helically wound steel wires for withstanding tensile stresses applied to the cable and several core units 61 surrounding the strand 60 of steel wires. Each core unit 61 has a central wire 70; a slotted rod 71 surrounding the central wire 70 and having peripheral helical slots 72; at least one optical ribbon 73 in each slot 72, the optical ribbon including a plurality of optical fibers; a sheath 74 for absorbing water surrounding the slotted rod 71; and a plastic sheath 75 surrounding the absorbent sheath 74.

A metal jacket 64 surrounds the core units 61, and a plastic sheath 65 surrounds the metal jacket 64. A compound 62 for blocking ingress of water fills spaces between the inner surface of the metal jacket 64 and the outside of the core units 61. A plastic sheath 65 further surrounds the metal jacket 64.

The present invention provides a submarine, optical fiber cable having 100 optical fibers. In contrast, the conventional cable was not capable of accommodating so many optical fibers. The submarine, optical-fiber cable of the present invention is suitable for operating in deep sea beds for a long period of time, for laying and raising operations, and for quick repair.

The cable of the present invention is characterized in that the presence of a slotted rod increases the pressure resistance of a hermetic pressure-resisting structure; an absorbent tape prevents ingress of water. The presence of absorbent tape and a suitable pitch of the slots prevents the withdrawal of optical ribbons during cable-raising operations. The presence of an absorbent tape makes optical fibers dry in the cable, enabling the reliability of the cable over a long period of time. It is easy to splice optical ribbons and the cable can be quickly repaired. Moreover, the cable of the present invention is economical to make and quite practical in its application.

Optical fibers used in the cable of the present invention may have residual tensile strains in the optical fibers so as to suppress stimulated Brillouin scattering. Therefore, permissible input power to the optical fibers increases so that a transmission line between repeaters may have a longer span.

It is to be understood that various alterations, modifications and/or additions may be made to the features of the possible and preferred embodiments of the invention as herein described without departing from the scope of the invention as defined in the claims.

TABLE 1

| | Size | Material |
| --- | --- | --- |
| Slotted rod | Outer diameter: 9.5 mm$\phi$ Slot: 1.4 mm × 2.4 mm | Polyethylene |
| Strength member | 1.83 mm$\phi$ × 20 | Steel wire |
| Metal jacket | Outer diameter: 14.5 mm$\phi$ Thickness: 0.7 mm | Copper |
| Plastic sheath | Outer diameter: 22.5 mm$\phi$ | Polyethylene |
| Absorbent tape | Width: 30 mm Lap: ½ | Powder of polysulfone acrylic compound |
| Resin compound | | Urethane resin |

What is claimed is:
1. A submarine, optical-fiber cable comprising:
a center wire;

a slotted rod surrounding said center wire, said slotted rod including peripheral helical slots, at least one of said slots receiving an optical ribbon, said optical ribbon having at least two optical fibers, each of said at least two optical fibers having a tensile strain ranging from about 0.01% to 0.3% along its axis;

an absorbent sheath surrounding said slotted rod and closing said slots of said slotted rod, said absorbent sheath including a layer surrounding and contacting said slotted rod for absorbing water;

a plurality of strength members helically wound around said absorbent sheath;

a metal jacket surrounding said strength members, the innermost surface of said metal jacket contacting at least one of said strength members;

at least one dam for preventing ingress water from spreading through a space between said strength members and between said absorbent sheath arid said metal jacket; and a plastic sheath surrounding said metal jacket, the innermost surface of said plastic sheath contacting said metal jacket;

wherein said cable is able to withstand hydrostatic pressures to which it is subjected.

2. A submarine, optical-fiber cable comprising:

a center wire;

a slotted rod surrounding said center wire, said slotted rod including peripheral helical slots, at least one of said slots receiving at least one optical fiber, said at least one optical fiber having a tensile strain ranging from about 0.01% to 0.3% along its axis;

an absorbent sheath surrounding said slotted rod and closing said slots of said slotted rod, said absorbent sheath including a layer surrounding and contacting said slotted rod for absorbing water;

a plurality of strength members helically wound around said absorbent sheath;

a metal jacket surrounding said strength members, the innermost surface of said metal jacket contacting at least one of said strength members;

at least one dam for preventing ingress water from spreading through a space between said strength members and between said absorbent sheath and said metal jacket; and a plastic sheath surrounding said metal jacket, the innermost surface of said plastic sheath contacting said metal jacket;

wherein said cable is able to withstand hydrostatic pressures to which it is subjected.

3. A submarine, optical-fiber cable as recited in claim 1 or 2, wherein said absorbent sheath comprises an absorbent tape.

4. A submarine, optical-fiber cable as recited in claim 1 or 2, wherein said layer for absorbing water comprises an acrylic compound for absorbing water.

5. A submarine, optical-fiber cable as recited in claim 1 or 2, wherein a winding pitch of said strength members smoothly changes within a range of about 10 to 100 times as much as the outer diameter of said slotted rod so as to modulate the tensile strain of said optical fibers.

6. A submarine, optical-fiber cable as recited in claim 5, wherein the winding pitch of said strength members smoothly changes within a range of 200 mm to 500 mm.

7. A submarine, optical-fiber cable as recited in claim 1 or 2, wherein a pitch of said slots ranges from about 25 to 60 times as much as the outer diameter of said slotted rod.

8. A submarine, optical-fiber cable as recited in claim 1 or 2, wherein said slots have a plurality of said dams leaving intervals between said dams.

9. A submarine, optical-fiber cable as recited in claim 1 or 2, wherein said slots is filled with a soft synthetic jelly so as to prevent water ingress therein.

10. A submarine, optical-fiber cable as recited in claim 1 or 2, wherein the tensile strain of said optical fibers ranges from about 0.05% to 0.2% along its axis.

11. A submarine, optical-fiber cable as recited in claim 1 or 2, wherein the tensile strain of said optical fibers is modulated so as to suppress stimulated Brillouin scattering therein.

* * * * *